Figure 1:
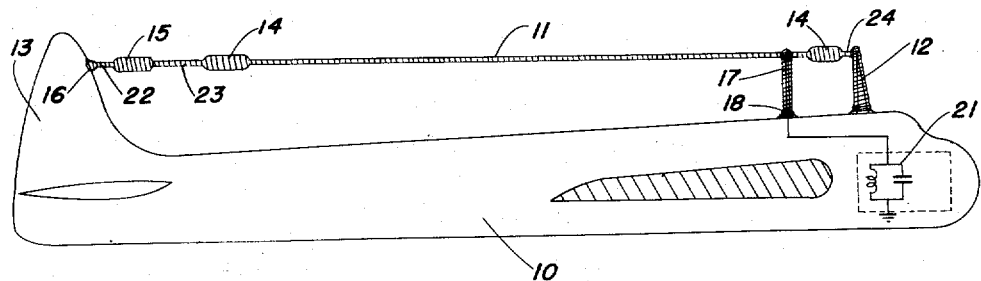

Sept. 11, 1951 W. C. HALL 2,567,205
PRECIPITATION STATIC REDUCING AIRCRAFT ANTENNA
Filed Oct. 7, 1947

Inventor
WAYNE C. HALL

M. O. Hayes

By

Attorney

Patented Sept. 11, 1951

2,567,205

UNITED STATES PATENT OFFICE 2,567,205

PRECIPITATION STATIC REDUCING AIRCRAFT ANTENNA

Wayne C. Hall, Cheverly, Md., assignor to Fredric Flader, Inc., North Tonawanda, N. Y., a corporation of New York Application October 7, 1947, Serial No. 778,450

8 Claims. (Cl. 250—33)

(Granted under the act of March 3, 1883, as amended April 30, 1928; 370 O. G. 757)

This invention relates to radio communication in aircraft and is particularly directed to reception on long wire antennas. Such antennas are normally positioned between a forward mast and the vertical stabilizer.

As has been long appreciated, under severe weather conditions rendering radio communication for navigational purposes absolutely necessary, radio contact frequently fails. Aviation history is replete with crashes under such conditions, many of which have been attributable directly to radio failure.

Many attempts have been made to avoid such failures. Shielded loops have been used. The potential metal surface aircraft has been discharged by fine wire dischargers, fluid droplet dischargers, and exhaust gas ionization. Some of these procedures have extended the range of weather conditions under which communication could be maintained, but the improvement has been insufficient under extreme conditions which may be encountered, and has been ineffective with respect to long wire antennas.

I have discovered that static interference on long wire antennas may be reduced sufficiently to render the receiver operative under conditions far past the threshold of inoperativeness under previous systems. My system may include in part components previously known. Aircraft dischargers to control the plane potential may be used, particularly those described in my applications Serial Numbers 469,606, 518,692, now Patents 2,466,024 and 2,466,311, respectively, granted April 5, 1949, and 726,194 now abandoned. Surface insulation, previously used in connection with other types of antennas, may be employed. Such measures, however, are ineffective in obtaining full efficiency of reception on long wire antennas.

According to my invention, the entire antenna not only must be enclosed in an insulating sheath, but this insulation may not be limited to the antenna alone. It must, in dielectric continuity, extend from the antenna over the strain insulators themselves, over spring tension units if employed, and over proximate supporting tension wires or other conductive structures adjacent the antenna. It may extend in dielectric continuity to the aerodynamic surface of the aircraft itself, and preferably does so.

The present invention was made during an initial survey of the problem of interference to aircraft reception. That survey subsequently developed into a comprehensive study of the physics of the charging and discharging of airborne craft, and of the radio interference generated by these processes. Papers relating to this project may be referred to Proc. I. R. E. vol. 34, pp. 156, 161, 167, 175 and 234. In the course of this study, the operation and effectiveness of the instant invention became more apparent.

The operation of the receiving systems of the present invention is effective in controlling corona discharge from the aircraft with particular respect to the antenna system. Corona from the antenna itself instantly blocks the receiver and must be prevented by suitable insulating material. The insulation enclosing the supporting conductive structures prevents corona from closely adjacent locations affecting the antenna. Consequently, the shock excitation previously encountered by discharges from the antenna supporting structure are avoided.

In case the strain insulators are connected to uninsulated supporting wires, as is conventional, to effect complete protection insulating tape may be wrapped around the wire and then over the insulator itself. In case insulated wire is used, looped about the insulator and wrapped on itself, the end of the wire must be protected where the conductor would be exposed. In the latter case, the insulating sheath need not enclose the insulator. Thick insulating tape, such as rubber electricians tape, or other similar tapes described below, covering the exposed end and extended to both sides thereof along the length of the supporting system, would be sufficient.

Under previous systems, the antenna was conventionally coupled to an input circuit which was conductively connected with the plane's metallic structure. The antenna itself was carried by attachment to the strain insulator, whose other end was supported by a grounded bracket or conductive structure. Even if the antenna itself were wholly sheathed, the insulator and supporting structure would discharge by corona. Surface conductivity of the insulator is believed to play a part in this process. The short leakage path permitted the insulator to build up to the high corona potential required by its large radius of curvature, and to generate a high energy discharge pulse. This is effectively prevented by the long leakage paths present in the instant invention.

Since corona is prevented from occurring adjacent the antenna, the remaining local interference is generated by more remote structures of the plane. Corona at such points is preferably to be eliminated by limiting the potential difference between the plane and the adjacent atmosphere.

Figure 2:
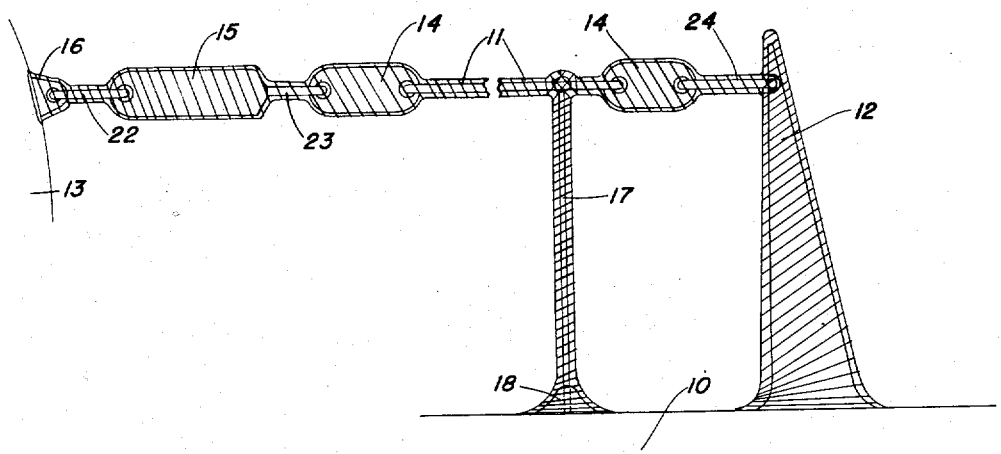
Figure 3:
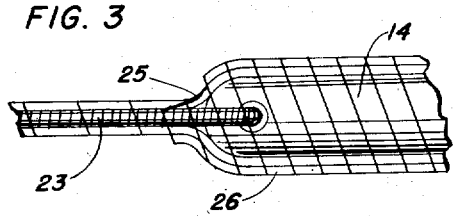

The invention will be further described with reference to the exemplary embodiment shown in the drawing, in which Fig. 1 is a view in diagrammatic profile of an aircraft embodying the invention, Fig. 2 is an enlarged showing of the antenna and supporting structure, Fig. 3 is a detail showing of a portion of the antenna system.

The aircraft 10 of Fig. 1 is of conventional metal construction. The horizontal antenna 11 is supported between mast 12 and stabilizer 13. Two insulator units 14 and one tension device 15 are shown. The tension member 15 is connected to bracket 16 on the stabilizer. Lead 17 is taken into the interior of the plane by feed-through insulator 18. The antenna where used for receiving is preferably by-passed to ground for low frequency signals, as shown, by an input circuit such as 21.

The connecting sections 22—24 supporting antenna 11 are metallic wire.

The insulating enclosure for the system is shown in detailed Figures 2 and 3. As explained above, not only must corona discharge be prevented from the antenna itself, but also from the associated supporting structure. To this end all metal parts of the system are wrapped with an adhesive insulating tape to form a continuous sheath thereover. While a number of thicknesses may be obtained by wrapping one piece on itself in overlapping relation, the sheath may be applied in two layers with the second overlying the seam of the first. Insulating varnishes may also be used, but preferably in conjunction with tape to provide an adequate protective thickness. Since potential differences between the aircraft and the atmosphere may be of the order of hundreds of kilovolts, a single coating of conventional insulating varnish would be practically useless.

Suitable insulating tapes may be of rubber or, particularly, polyethylene resin. Other insulating substances may be used, and the sheath may be formed otherwise than by coating or adhesive attachment.

As shown in Fig. 2, the insulating tape is wrapped over the entire antenna 11, lead in 17, and feed-through insulator 18. For the purposes of illustration, transparent insulation has been shown.

The insulation is carried continuously over the end of antenna wire 11 at its attachment to insulator 14 to enclose the metal present. Preferably the ceramic material of the insulator is insulated also, and supporting guy 24 is sheathed to mast 12. The latter is wholly insulated down to its base at the aerodynamic surface of the aircraft.

The antenna sheath is carried over near insulator 14, guy 23, tension unit 15 and guy 22 to bracket 16. The latter is wrapped down to its base at the stabilizer 13. Thus there is no exposed metallic surface on the antenna or on its supporting structure.

Fig. 3 shows in detail a portion of the sheath applied to guy 23 and insulator 14. An inner layer of transparent tape 25 is wrapped over the wire and insulator, its edges in abutting relation. A second layer 26 is then applied, overlying the seam in the first layer.

The system thus provided is protected from shock excitation by corona discharge from the antenna and its supporting structure.

The system is of particular utility when used in combination with an aircraft employing resistive wick dischargers attached to the wing tip and stabilizer surfaces. These dischargers are further described in my application Serial Numbers 469,606, 518,692 and 726,194, of which this is a continuation in part.

The invention described herein may be manufactured and used by or for the Government of the United States of America for governmental purposes without the payment of any royalties thereon or therefor.

What is claimed is:

1. In combination with an aircraft having conductive aerodynamic surfaces, an aircraft antenna system comprising, a conductive linear antenna member, means supporting said antenna member at its ends in spaced and insulated relation to said aircraft including an insulator and means connecting said insulator to said aircraft, and an insulating sheath wholly enclosing said antenna and said supporting means and extending in dielectric continuity to the aerodynamic surfaces of said aircraft.

2. In combination with an aircraft having conductive aerodynamic surfaces, an aircraft antenna system comprising a longitudinal wire antenna, an insulator at each end thereof, two lengths of supporting wire, each connected at one end to one of said insulators and at the other end to said aircraft, for supporting said antenna under tension in spaced and insulated relation to said aircraft, and an insulating sheath wholly enclosing said antenna, said insulators and said supporting wires and extending in dielectric continuity to the aerodynamic surfaces of said aircraft.

3. In combination with an aircraft having conductive aerodynamic surfaces, an aircraft antenna system comprising a mast projecting from said aircraft, a first supporting wire connected at one end to said mast, a first insulator connected to the other end of said supporting wire, a longitudinal wire antenna connected at one end to said first insulator, a second insulator connected to the other end of said antenna, a second supporting wire connected between said second insulator and said aircraft, a lead-in wire connected to said antenna and extending therefrom through the aerodynamic surface of said aircraft, and an insulating sheath wholly enclosing said antenna, said insulators, said supporting wires and said lead-in wire, and extending in dielectric continuity to the aerodynamic surfaces of said aircraft.

4. The combination as claimed in claim 1 wherein said sheath comprises at least one layer of insulating tape, wrapped in dielectric continuity upon said antenna and said supporting means.

5. The combination as claimed in claim 1 wherein said sheath is composed of polyethylene.

6. In combination with an aircraft having conductive aerodynamic surfaces and an antenna mounted in spaced relation thereto, means for preventing discharge from said antenna comprising an insulating sheath wholly enclosing said antenna, and means for discharging said aircraft at other points comprising a multiplicity of fine, filar discharge points electrically connected to said conductive aerodynamic surfaces.

7. In combination with an aircraft having conductive aerodynamic surfaces and an antenna with means supporting said antenna in spaced relation to said conductive surfaces, means for preventing discharge from said antenna comprising an insulating sheath wholly enclosing said antenna and said supporting means and extending in dielectric continuity to said aerodynamic surfaces, and means for discharging said aircraft comprising a plurality of electrodes electrically connected to said conductive aerodynamic surfaces in regions of high electrical field, said electrodes including a fibrous material having a multiplicity of free surface fibers each affording a conductive path of microscopic cross-section.

8. In combination with an aircraft having conductive aerodynamic surfaces and an antenna with means supporting said antenna in spaced relation to said conductive surfaces, means for preventing discharge from said antenna comprising an insulating sheath wholly enclosing said antenna and said supporting means and extending in dielectric continuity to said aerodynamic surfaces, and means for discharging said aircraft comprising a plurality of electrodes electrically connected to said conductive aerodynamic surfaces in regions of high electrical field, said electrodes each comprising an exposed mass of normally non-conductive fibrous material having myriad projecting fibers with free ends having radii of curvature of microscopic order, said fibers carrying highly resistive films of conductive material, which films have in the area of said free ends a thickness of microscopic order.

WAYNE C. HALL.

REFERENCES CITED

The following references are of record in the file of this patent:

UNITED STATES PATENTS

| Number | Name | Date |
| --- | --- | --- |
| 1,743,078 | Mirick | Jan. 7, 1930 |
| 1,962,202 | Meredith | June 12, 1934 |
| 2,136,532 | West | Nov. 15, 1938 |
| 2,282,402 | Hefele | May 12, 1942 |
| 2,316,623 | Van B. Roberts | Apr. 13, 1943 |
| 2,320,146 | Leake | May 25, 1943 |
| 2,357,788 | Yoder | Sept. 5, 1944 |
| 2,373,660 | Closson | Apr. 17, 1945 |
| 2,416,280 | Bennett | Feb. 25, 1947 |
| 2,418,961 | Wehner | Apr. 15, 1947 |

OTHER REFERENCES

Proceedings of the IRE, May 1939, by H. Hucke, pages 301–316.

Beach: "What of Air Safety?"; Electrical Engineering, May 1948, pages 423–429.

Certificate of Correction

Patent No. 2,567,205 September 11, 1951

WAYNE C. HALL

It is hereby certified that error appears in the printed specification of the above numbered patent requiring correction as follows:

Column 1, lines 32 to 34, inclusive, for "518,692, now Patents 2,466,024 and 2,466,311, respectively, granted April 5, 1949, and 726,194 now abandoned." read *726,194, now Patents 2,466,024 and 2,466,311, respectively, granted April 5, 1949, and 518,692 now abandoned.*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*